US009372940B2

(12) United States Patent
Raichelgauz et al.

(10) Patent No.: US 9,372,940 B2
(45) Date of Patent: *Jun. 21, 2016

(54) APPARATUS AND METHOD FOR DETERMINING USER ATTENTION USING A DEEP-CONTENT-CLASSIFICATION (DCC) SYSTEM

(71) Applicant: CORTICA, LTD., Ramat Gan (IL)

(72) Inventors: Igal Raichelgauz, Ramat Gan (IL); Karina Odinaev, Ramat Gan (IL); Yehoshua Y. Zeevi, Haifa (IL)

(73) Assignee: Cortica, Ltd., Tel Aviv (IL)

( * ) Notice: Subject to any disclaimer, the term of this patent is extended or adjusted under 35 U.S.C. 154(b) by 0 days.

This patent is subject to a terminal disclaimer.

(21) Appl. No.: 14/013,636

(22) Filed: Aug. 29, 2013

(65) Prior Publication Data

US 2014/0006442 A1 Jan. 2, 2014

Related U.S. Application Data

(63) Continuation-in-part of application No. 13/602,858, filed on Sep. 4, 2012, now Pat. No. 8,868,619, which is a continuation of application No. 12/603,123, filed on Oct. 21, 2009, now Pat. No. 8,266,185, which is a (Continued)

(30) Foreign Application Priority Data

Oct. 26, 2005 (IL) .......................................... 171577
Jan. 29, 2006 (IL) .......................................... 173409
Aug. 21, 2007 (IL) .......................................... 185414

(51) Int. Cl.
G06F 7/00 (2006.01)
G06F 17/30 (2006.01)
G06Q 30/02 (2012.01)

(52) U.S. Cl.
CPC ...... *G06F 17/30979* (2013.01); *G06F 17/3002* (2013.01); *G06Q 30/0241* (2013.01)

(58) Field of Classification Search
None
See application file for complete search history.

(56) References Cited

U.S. PATENT DOCUMENTS 4,972,363 A   11/1990   Nguyen et al.
5,887,193 A   3/1999    Takahashi et al.

(Continued)

FOREIGN PATENT DOCUMENTS

WO    02/31764        4/2002
WO    2007/049282     5/2007

OTHER PUBLICATIONS

Foote, Jonathan, et al. "Content-Based Retrieval of Music and Audio", 1997 Institute of Systems Science, National University of Singapore, Singapore (Abstract).

(Continued)

*Primary Examiner* — Uyen Le
(74) *Attorney, Agent, or Firm* — M&B IP Analysts, LLC

(57) ABSTRACT

A method for determining a user attention to at least one multimedia data element (MMDE) displayed in a web-page over a user computing device. The method comprises receiving a request to determine the user attention, wherein the request includes at least the web-page and an identification of the at least one MMDE in the web-page; receiving at least one sensory signal captured by at least one sensor connected to the user computing device; querying a deep-content-classification (DCC) system to find a match between at least one concept structure and the received sensory signal; receiving a first set of metadata related to the at least one matched concept structure; analyzing the returned set of metadata to determine the user attention with respect to the at least one MMDE; and associating the at least one MMDE with the determined user attention.

18 Claims, 8 Drawing Sheets

Related U.S. Application Data continuation-in-part of application No. 12/084,150, filed as application No. PCT/IL2006/001235 on Oct. 26, 2006, now Pat. No. 8,655,801, application No. 12/603,123, which is a continuation-in-part of application No. 12/195,863, filed on Aug. 21, 2008, now Pat. No. 8,326,775, which is a continuation-in-part of application No. 12/084,150, application No. 12/603,123, which is a continuation-in-part of application No. 12/348,888, filed on Jan. 5, 2009, and a continuation-in-part of application No. 12/084,150, and a continuation-in-part of application No. 12/195,863, application No. 12/538,495, which is a continuation-in-part of application No. 12/084,150, and a continuation-in-part of application No. 12/195,863, and a continuation-in-part of application No. 12/348,888.

(60) Provisional application No. 61/789,460, filed on Mar. 15, 2013.

(56) References Cited

U.S. PATENT DOCUMENTS

| | | | |
|---|---|---|---|
| 5,940,821 | A | 8/1999 | Wical |
| 5,978,754 | A | 11/1999 | Kumano |
| 5,987,454 | A | 11/1999 | Hobbs |
| 6,038,560 | A | 3/2000 | Wical |
| 6,052,481 | A | 4/2000 | Grajski et al. |
| 6,076,088 | A | 6/2000 | Paik et al. |
| 6,122,628 | A | 9/2000 | Castelli et al. |
| 6,240,423 | B1 | 5/2001 | Hirata |
| 6,243,375 | B1 | 6/2001 | Speicher |
| 6,363,373 | B1 | 3/2002 | Steinkraus |
| 6,381,656 | B1 | 4/2002 | Shankman |
| 6,411,229 | B2 | 6/2002 | Kobayashi |
| 6,422,617 | B1 | 7/2002 | Fukumoto et al. |
| 6,493,692 | B1 | 12/2002 | Kobayashi et al. |
| 6,493,705 | B1 | 12/2002 | Kobayashi et al. |
| 6,523,022 | B1 | 2/2003 | Hobbs |
| 6,524,861 | B1 | 2/2003 | Anderson |
| 6,526,400 | B1 | 2/2003 | Takata et al. |
| 6,560,597 | B1 | 5/2003 | Dhillon et al. |
| 6,601,060 | B1 | 7/2003 | Tomaru |
| 6,611,628 | B1 | 8/2003 | Sekiguchi et al. |
| 6,611,837 | B2 | 8/2003 | Schreiber |
| 6,618,711 | B1 | 9/2003 | Ananth |
| 6,643,620 | B1 | 11/2003 | Contolini et al. |
| 6,643,643 | B1 | 11/2003 | Lee et al. |
| 6,675,159 | B1 | 1/2004 | Lin et al. |
| 6,728,706 | B2 | 4/2004 | Aggarwal et al. |
| 6,751,363 | B1 | 6/2004 | Natsev et al. |
| 6,754,435 | B2 | 6/2004 | Kim |
| 6,763,519 | B1 | 7/2004 | McColl et al. |
| 6,804,356 | B1 | 10/2004 | Krishnamachari |
| 6,819,797 | B1 | 11/2004 | Smith et al. |
| 6,836,776 | B2 | 12/2004 | Schreiber |
| 6,845,374 | B1 | 1/2005 | Oliver et al. |
| 6,901,207 | B1 | 5/2005 | Watkins |
| 6,970,881 | B1 | 11/2005 | Mohan et al. |
| 6,978,264 | B2 | 12/2005 | Chandrasekar et al. |
| 7,006,689 | B2 | 2/2006 | Kasutani |
| 7,013,051 | B2 | 3/2006 | Sekiguchi et al. |
| 7,124,149 | B2 | 10/2006 | Smith et al. |
| 7,260,564 | B1 | 8/2007 | Lynn et al. |
| 7,296,012 | B2 | 11/2007 | Ohashi |
| 7,302,117 | B2 | 11/2007 | Sekiguchi et al. |
| 7,313,805 | B1 | 12/2007 | Rosin et al. |
| 7,346,629 | B2 | 3/2008 | Kapur et al. |
| 7,392,238 | B1 | 6/2008 | Zhou et al. |
| 7,406,459 | B2 | 7/2008 | Chen et al. |
| 7,450,740 | B2 | 11/2008 | Shah et al. |
| 7,523,102 | B2 | 4/2009 | Bjarnestam et al. |
| 7,526,607 | B1 | 4/2009 | Singh et al. |
| 7,536,384 | B2 | 5/2009 | Venkataraman et al. |
| 7,542,969 | B1 | 6/2009 | Rappaport et al. |
| 7,548,910 | B1 | 6/2009 | Chu et al. |
| 7,555,477 | B2 | 6/2009 | Bayley et al. |
| 7,555,478 | B2 | 6/2009 | Bayley et al. |
| 7,562,076 | B2 | 7/2009 | Kapur |
| 7,574,436 | B2 | 8/2009 | Kapur et al. |
| 7,574,668 | B2 | 8/2009 | Nunez et al. |
| 7,694,318 | B2 | 4/2010 | Eldering et al. |
| 7,920,894 | B2 | 4/2011 | Wyler |
| 7,921,107 | B2 | 4/2011 | Chang et al. |
| 7,974,994 | B2 | 7/2011 | Li et al. |
| 7,987,194 | B1 | 7/2011 | Walker et al. |
| 7,991,715 | B2 | 8/2011 | Schiff et al. |
| 8,000,655 | B2 | 8/2011 | Wang et al. |
| 8,036,893 | B2 | 10/2011 | Reich |
| 8,098,934 | B2 | 1/2012 | Vincent et al. |
| 8,266,185 | B2 | 9/2012 | Raichelgauz et al. |
| 8,312,031 | B2 | 11/2012 | Raichelgauz et al. |
| 8,316,005 | B2 | 11/2012 | Moore |
| 8,677,377 | B2 | 3/2014 | Cheyer et al. |
| 8,682,667 | B2 | 3/2014 | Haughay |
| 8,688,446 | B2 | 4/2014 | Yanagihara |
| 8,706,503 | B2 | 4/2014 | Cheyer et al. |
| 8,775,442 | B2 | 7/2014 | Moore et al. |
| 8,868,619 | B2 | 10/2014 | Raichelgauz et al. |
| 8,880,539 | B2 | 11/2014 | Raichelgauz et al. |
| 8,880,566 | B2 | 11/2014 | Raichelgauz et al. |
| 8,898,568 | B2 | 11/2014 | Bull et al. |
| 8,922,414 | B2 | 12/2014 | Raichelgauz et al. |
| 8,959,037 | B2 | 2/2015 | Raichelgauz et al. |
| 8,990,125 | B2 | 3/2015 | Raichelgauz et al. |
| 9,009,086 | B2 | 4/2015 | Raichelgauz et al. |
| 9,031,999 | B2 | 5/2015 | Raichelgauz et al. |
| 9,087,049 | B2 | 7/2015 | Raichelgauz et al. |
| 9,104,747 | B2 | 8/2015 | Raichelgauz et al. |
| 9,191,626 | B2 | 11/2015 | Raichelgauz et al. |
| 9,197,244 | B2 | 11/2015 | Raichelgauz et al. |
| 9,218,606 | B2 | 12/2015 | Raichelgauz et al. |
| 9,235,557 | B2 | 1/2016 | Raichelgauz et al. |
| 9,256,668 | B2 | 2/2016 | Raichelgauz et al. |
| 2001/0019633 | A1 | 9/2001 | Tenze et al. |
| 2001/0056427 | A1 | 12/2001 | Yoon et al. |
| 2002/0087530 | A1 | 7/2002 | Smith et al. |
| 2002/0107827 | A1 | 8/2002 | Benitez-Jimenez et al. |
| 2002/0123928 | A1 | 9/2002 | Eldering et al. |
| 2002/0126872 | A1 | 9/2002 | Brunk et al. |
| 2002/0178410 | A1 | 11/2002 | Haitsma et al. |
| 2003/0028660 | A1 | 2/2003 | Igawa et al. |
| 2003/0041047 | A1 | 2/2003 | Chang et al. |
| 2003/0078766 | A1 | 4/2003 | Appelt et al. |
| 2003/0182567 | A1 | 9/2003 | Barton et al. |
| 2003/0191764 | A1 | 10/2003 | Richards |
| 2004/0068510 | A1 | 4/2004 | Hayes et al. |
| 2004/0107181 | A1 | 6/2004 | Rodden |
| 2004/0111465 | A1 | 6/2004 | Chuang et al. |
| 2004/0128142 | A1 | 7/2004 | Whitham |
| 2004/0128511 | A1 | 7/2004 | Sun et al. |
| 2004/0153426 | A1 | 8/2004 | Nugent |
| 2004/0249779 | A1 | 12/2004 | Nauck et al. |
| 2005/0177372 | A1 | 8/2005 | Wang et al. |
| 2006/0020860 | A1 | 1/2006 | Tardif et al. |
| 2006/0026203 | A1 | 2/2006 | Tan et al. |
| 2006/0031216 | A1 | 2/2006 | Semple et al. |
| 2006/0064037 | A1 | 3/2006 | Shalon et al. |
| 2006/0153296 | A1 | 7/2006 | Deng |
| 2006/0159442 | A1 | 7/2006 | Kim et al. |
| 2006/0173688 | A1 | 8/2006 | Whitham |
| 2006/0204035 | A1 | 9/2006 | Guo et al. |
| 2006/0236343 | A1 | 10/2006 | Chang |
| 2006/0242139 | A1 | 10/2006 | Butterfield et al. |
| 2006/0242554 | A1 | 10/2006 | Gerace et al. |
| 2006/0248558 | A1 | 11/2006 | Barton et al. |
| 2006/0253423 | A1 | 11/2006 | McLane et al. |
| 2007/0009159 | A1 | 1/2007 | Fan |
| 2007/0011151 | A1 | 1/2007 | Hagar et al. |
| 2007/0038608 | A1 | 2/2007 | Chen |
| 2007/0074147 | A1 | 3/2007 | Wold |
| 2007/0130112 | A1 | 6/2007 | Lin |
| 2007/0130159 | A1 | 6/2007 | Gulli et al. |

(56) References Cited

U.S. PATENT DOCUMENTS

| | | |
|---|---|---|
| 2007/0174320 A1 | 7/2007 | Chou |
| 2007/0195987 A1 | 8/2007 | Rhoads |
| 2007/0220573 A1 | 9/2007 | Chiussi et al. |
| 2007/0244902 A1 | 10/2007 | Seide et al. |
| 2007/0253594 A1 | 11/2007 | Lu et al. |
| 2007/0268309 A1 | 11/2007 | Tanigawa et al. |
| 2007/0282826 A1 | 12/2007 | Hoeber et al. |
| 2007/0294295 A1 | 12/2007 | Finkelstein et al. |
| 2008/0049629 A1 | 2/2008 | Morrill |
| 2008/0072256 A1 | 3/2008 | Boicey et al. |
| 2008/0091527 A1 | 4/2008 | Silverbrook et al. |
| 2008/0163288 A1 | 7/2008 | Ghosal et al. |
| 2008/0165861 A1 | 7/2008 | Wen et al. |
| 2008/0172615 A1 | 7/2008 | Igelman et al. |
| 2008/0201299 A1 | 8/2008 | Lehikoinen et al. |
| 2008/0204706 A1 | 8/2008 | Magne et al. |
| 2008/0253737 A1 | 10/2008 | Kimura et al. |
| 2008/0270373 A1 | 10/2008 | Oostveen et al. |
| 2008/0313140 A1 | 12/2008 | Pereira et al. |
| 2009/0013414 A1 | 1/2009 | Washington et al. |
| 2009/0037408 A1 | 2/2009 | Rodgers |
| 2009/0089587 A1 | 4/2009 | Brunk et al. |
| 2009/0119157 A1 | 5/2009 | Dulepet |
| 2009/0148045 A1 | 6/2009 | Lee et al. |
| 2009/0172030 A1* | 7/2009 | Schiff et al. ............. 707/104.1 |
| 2009/0175538 A1 | 7/2009 | Bronstein et al. |
| 2009/0245603 A1 | 10/2009 | Koruga et al. |
| 2009/0253583 A1 | 10/2009 | Yoganathan |
| 2009/0277322 A1 | 11/2009 | Cai et al. |
| 2010/0082684 A1 | 4/2010 | Churchill et al. |
| 2010/0104184 A1 | 4/2010 | Bronstein et al. |
| 2010/0162405 A1 | 6/2010 | Cook et al. |
| 2010/0268524 A1 | 10/2010 | Nath et al. |
| 2010/0306193 A1 | 12/2010 | Pereira et al. |
| 2010/0318493 A1 | 12/2010 | Wessling |
| 2010/0322522 A1 | 12/2010 | Wang et al. |
| 2011/0052063 A1 | 3/2011 | McAuley et al. |
| 2011/0055585 A1 | 3/2011 | Lee |
| 2011/0145068 A1 | 6/2011 | King et al. |
| 2011/0202848 A1 | 8/2011 | Ismalon |
| 2011/0246566 A1 | 10/2011 | Kashef et al. |
| 2011/0251896 A1 | 10/2011 | Impollonia et al. |
| 2011/0313856 A1 | 12/2011 | Cohen et al. |
| 2012/0131454 A1 | 5/2012 | Shah |
| 2012/0167133 A1 | 6/2012 | Carroll et al. |
| 2012/0197857 A1 | 8/2012 | Huang et al. |
| 2012/0330869 A1 | 12/2012 | Durham |
| 2013/0031489 A1 | 1/2013 | Gubin et al. |
| 2013/0067035 A1 | 3/2013 | Amanat et al. |
| 2013/0086499 A1 | 4/2013 | Dyor et al. |
| 2013/0325550 A1 | 12/2013 | Varghese et al. |
| 2013/0332951 A1 | 12/2013 | Gharaat et al. |
| 2014/0019264 A1 | 1/2014 | Wachman et al. |
| 2015/0289022 A1 | 10/2015 | Gross |

OTHER PUBLICATIONS

Ribert et al. "An Incremental Hierarchical Clustering", Visicon Interface 1999, pp. 586-591.

Verstraeten et al., "Isolated word recognition with the Liquid State Machine: a case study"; Department of Electronics and Information Systems, Ghent University, Sint-Pietersnieuwstraat 41, 9000 Gent, Belgium, Available online Jul. 14, 2005.

Zhou et al., "Medical Diagnosis With C4.5 Rule Preceded by Artificial Neural Network Ensemble"; IEEE Transactions on Information Technology in Biomedicine, vol. 7, Issue: 1, pp. 37-42, Date of Publication: Mar. 2003.

Cernansky et al., "Feed-forward Echo State Networks"; Proceedings of International Joint Conference on Neural Networks, Montreal, Canada, Jul. 31-Aug. 4, 2005.

Lyon, Richard F.; "Computational Models of Neural Auditory Processing"; IEEE International Conference on Acoustics, Speech, and Signal Processing, ICASSP '84, Date of Conference: Mar. 1984, vol. 9, pp. 41-44.

Freisleben et al., "Recognition of Fractal Images Using a Neural Network", Lecture Notes in Computer Science, 1993, vol. 6861, 1993, pp. 631-637.

Ware et al., "Locating and Identifying Components in a Robot's Workspace using a Hybrid Computer Architecture"; Proceedings of the 1995 IEEE International Symposium on Intelligent Control, Aug. 27-29, 1995, pp. 139-144.

Zhou et al., "Ensembling neural networks: Many could be better than all"; National Laboratory for Novel Software Technology, Nanjing Unviersirty, Hankou Road 22, Nanjing 210093, PR China; Received Nov. 16, 2001, Available online Mar. 12, 2002.

Fathy et al., "A Parallel Design and Implementation for Backpropagation Neural Network Using NIMD Architecture", 8th Mediterranean Electrotechnical Corsfe rersce, 19'96. MELECON '96, Date of Conference: May 13-16, 1996, vol. 3, pp. 1472-1475.

Howlett et al., "A Multi-Computer Neural Network Architecture in a Virtual Sensor System Application", International Journal of Knowledge-based Intelligent Engineering Systems, 4 (2). pp. 86-93, 133N 1327-2314; first submitted Nov. 30, 1999; revised version submitted Mar. 10, 2000.

Ortiz-Boyer et al., "CIXL2: A Crossover Operator for Evolutionary Algorithms Based on Population Features", Journal of Artificial Intelligence Research 24 (2005) 1-48 Submitted Nov. 2004; published Jul. 2005.

Lin, C.; Chang, S.: "Generating Robust Digital Signature for Image/Video Authentication", Multimedia and Security Workshop at ACM Mutlimedia '98; Bristol, U.K., Sep. 1998; pp. 49-54.

Iwamoto, K.; Kasutani, E.; Yamada, A.: "Image Signature Robust to Caption Superimposition for Video Sequence Identification"; 2006 IEEE International Conference on Image Processing; pp. 3185-3188, Oct. 8-11, 2006; doi: 10.1109/ICIP.2006.313046.

Maass, W. et al.: "Computational Models for Generic Cortical Microcircuits", Institute for Theoretical Computer Science, Technische Universitaet Graz, Graz, Austria, published Jun. 10, 2003.

Raichelgauz, I. et al.: "Co-evolutionary Learning in Liquid Architectures", Lecture Notes in Computer Science, [Online] vol. 3512, Jun. 21, 2005, pp. 241-248, XP019010280 Springer Berlin / Heidelberg ISSN: 1611-3349 ISBN: 978-3-540-26208-4.

Jaeger, H.: "The "echo state" approach to analysing and training recurrent neural networks", GMD Report, No. 148, 2001, pp. 1-43, XP002466251. German National Research Center for Information Technology.

Verstraeten et al.: "Isolated word recognition with the Liquid State Machine: a case study", Information Processing Letters, Amsterdam, NL, vol. 95, No. 6, Sep. 30, 2005, pp. 521-528, XP005028093 ISSN: 0020-0190.

Zeevi, Y. et al.: "Natural Signal Classification by Neural Cliques and Phase-Locked Attractors", IEEE World Congress on Computational Intelligence, IJCNN2006, Vancouver, Canada, Jul. 2006, XP002466252.

Natsclager, T. et al.: "The "liquid computer": A novel strategy for real-time computing on time series", Special Issue on Foundations of Information Processing of Telematik, vol. 8, No. 1, 2002, pp. 39-43, XP002466253.

Morad, T.Y. et al.: "Performance, Power Efficiency and Scalability of Asymmetric Cluster Chip Multiprocessors", Computer Architecture Letters, vol. 4, Jul. 4, 2005, pp. 1-4, XP002466254.

Burgsteiner et al.: "Movement Prediction From Real-World Images Using a Liquid State Machine", Innovations in Applied Artificial Intelligence Lecture Notes in Computer Science, Lecture Notes in Artificial Intelligence, LNCS, Springer-Verlag, BE, vol. 3533, Jun. 2005, pp. 121-130.

Xian-Sheng Hua et al.: "Robust Video Signature Based on Ordinal Measure" In: 2004 International Conference on Image Processing, ICIP '04; Microsoft Research Asia, Beijing, China; published Oct. 24-27, 2004, pp. 685-688.

IPO Examination Report under Section 18(3) for corresponding UK application No. GB1001219.3, dated Sep. 12, 2011.

International Search Report for the corresponding International Patent Application PCT/IL2006/001235; Date of Mailing: Nov. 2, 2008.

(56) References Cited

OTHER PUBLICATIONS

International Search Authority: "Written Opinion of the International Searching Authority" (PCT Rule 43bis.1) including International Search Report for International Patent Application No. PCT/US2008/073852; Date of Mailing: Jan. 28, 2009.
International Search Authority: International Preliminary Report on Patentability (Chapter I of the Patent Cooperation Treaty) including "Written Opinion of the International Searching Authority" (PCT Rule 43bis. 1) for the corresponding International Patent Application No. PCT/IL2006/001235; Date of Issuance: Jul. 28, 2009.
Boari et al, "Adaptive Routing for Dynamic Applications in Massively Parallel Architectures", 1995 IEEE, Spring 1995.
Cococcioni, et al, "Automatic Diagnosis of Defects of Rolling Element Bearings Based on Computational Intelligence Techniques", University of Pisa, Pisa, Italy, 2009.
Emami, et al, "Role of Spatiotemporal Oriented Energy Features for Robust Visual Tracking in Video Surveillance, University of Queensland", St. Lucia, Australia, 2012.
Garcia, "Solving the Weighted Region Least Cost Path Problem Using Transputers", Naval Postgraduate School, Monterey, California, Dec. 1989.
Mandhaoui, et al, "Emotional Speech Characterization Based on Multi-Features Fusion for Face-to-Face Interaction", Universite Pierre et Marie Curie, Paris, France, 2009.
Marti, et al, "Real Time Speaker Localization and Detection System for Camera Steering in Multiparticipant Videoconferencing Environments", Universidad Politecnica de Valencia, Spain, 2011.
Nagy et al, "A Transputer, Based, Flexible, Real-Time Control System for Robotic Manipulators", UKACC International Conference on Control '96, Sep. 2-5, 1996, Conference 1996, Conference Publication No. 427, IEE 1996.
Scheper, et al. "Nonlinear dynamics in neural computation", ESANN'2006 proceedings—European Symposium on Artificial Neural Networks, Bruges (Belgium), Apr. 26-28, 2006, d-side publi, ISBN 2-930307-06-4.
Theodoropoulos et al, "Simulating Asynchronous Architectures on Transputer Networks", Proceedings of the Fourth Euromicro Workshop on Parallel and Distributed Processing, 1996. PDP '96.
Guo et al, "AdOn: An Intelligent Overlay Video Advertising System", SIGIR, Boston, Massachusetts, Jul. 19-23, 2009.
Mei, et al., "Contextual In-Image Advertising", Microsoft Research Asia, pp. 439-448, 2008.
Mei, et al., "VideoSense—Towards Effective Online Video Advertising", Microsoft Research Asia, pp. 1075-1084, 2007.
Semizarov et al. "Specificity of Short Interfering RNA Determined through Gene Expression Signatures", PNAS, 2003, pp. 6347-6352.
Liu, et al., "Instant Mobile Video Search With Layered Audio-Video Indexing and Progressive Transmission", Multimedia, IEEE Transactions on Year 2014, vol. 16, Issue: 8, pp. 2242-2255, DOI: 10.1109/TMM.20142359332 IEEE Journals & Magazines.
Mladenovic, et al., "Electronic Tour Guide for Android Mobile Platform with Multimedia Travel Book", Telecommunications Forum (TELFOR), 2012 20th Year: 2012, pp. 1460-1463, DOI: 10.11091 TELFOR.2012.6419494 IEEE Conference Publications.
Park, et al., "Compact Video Signatures for Near-Duplicate Detection on Mobile Devices", Consumer Electronics (ISCE 2014), The 18th IEEE International Symposium on Year: 2014, pp. 1-2, DOI: 10.1109/ISCE.2014.6884293 IEEE conference Publications.
Wang et al. "A Signature for Content-based Image Retrieval Using a Geometrical Transform", ACM 1998, pp. 229-234.
Zang, et al., "A New Multimedia Message Customizing Framework for Mobile Devices", Multimedia and Expo, 2007 IEEE International Conference on Year: 2007, pp. 1043-1046, DOI: 10.1109/ICME.2007.4284832 IEEE Conference Publications.
Clement, et al. "Speaker Diarization of Heterogeneous Web Video Files: A Preliminary Study", Acoustics, Speech and Signal Processing (ICASSP), 2011, IEEE International Conference on Year: 2011, pp. 4432-4435, DOI: 10.1109/ICASSP.2011.5947337 IEEE Conference Publications, France.
Gong, et al., "A Knowledge-based Mediator for Dynamic Integration of Heterogeneous Multimedia Information Sources", Video and Speech Processing, 2004, Proceedings of 2004 International Symposium on Year: 2004, pp. 467-470, DOI: 10.1109/ISIMP.2004.1434102 IEEE Conference Publications, Hong Kong.
Lin, et al., "Robust Digital Signature for Multimedia Authentication: A Summary", IEEE Circuits and Systems Magazine, 4th Quarter 2003, pp. 23-26.
Lin, et al., "Summarization of Large Scale Social Network Activity", Acoustics, Speech and Signal Processing, 2009, ICASSP 2009, IEEE International Conference on Year 2009, pp. 3481-3484, DOI: 10.1109/ICASSP2009.4960375, IEEE Conference Publications, Arizona.
Nouza, et al., "Large-scale Processing, Indexing and Search System for Czech Audio-Visual Heritage Archives", Multimedia Signal Processing (MMSP), 2012, pp. 337-342, IEEE 14th Intl. Workshop, DOI: 10.1109/MMSP.2012.6343465, Czech Republic.
May et al., "The Transputer", Springer-Verlag, Berlin Heidelberg, 1989, teaches multiprocessing system.
Vailaya, et al., "Content-Based Hierarchical Classification of Vacation Images," I.E.E.E.: Multimedia Computing and Systems, vol. 1, 1999, East Lansing, MI, pp. 518-523.
Whitby-Strevens, "The Transputer", 1985 IEEE, Bristol, UK.
Yanai, "Generic Image Classification Using Visual Knowledge on the Web," MM'03, Nov. 2-8, 2003, Tokyo, Japan, pp. 167-176.

\* cited by examiner

APPARATUS AND METHOD FOR DETERMINING USER ATTENTION USING A DEEP-CONTENT-CLASSIFICATION (DCC) SYSTEM

CROSS-REFERENCE TO RELATED APPLICATIONS

This application claims the benefit of U.S. provisional application No. 61/789,460 filed Mar. 15, 2013 and is a continuation-in-part (CIP) application of U.S. patent application Ser. No. 13/602,858 filed Sep. 4, 2012, which is a continuation of U.S. patent application Ser. No. 12/603,123, filed on Oct. 21, 2009, now issued as U.S. Pat. No. 8,266,185, which is a continuation-in-part of:

(1) U.S. patent application Ser. No. 12/084,150 having a filing date of Apr. 7, 2009, which is the National Stage of International Application No. PCT/IL2006/001235, filed on Oct. 26, 2006, which claims foreign priority from Israeli Application No. 171577 filed on Oct. 26, 2005 and Israeli Application No. 173409 filed on 29 Jan. 2006;

(2) U.S. patent application Ser. No. 12/195,863, filed Aug. 21, 2008, now pending, which claims priority under 35 USC 119 from Israeli Application No. 185414, filed on Aug. 21, 2007, and which is also a continuation-in-part of the above-referenced U.S. patent application Ser. No. 12/084,150;

(3) U.S. patent application Ser. No. 12/348,888, filed Jan. 5, 2009, which is a CIP of U.S. patent application Ser. No. 12/084,150, having a filing date of Apr. 7, 2009 and U.S. patent application Ser. No. 12/195,863 filed on Aug. 21, 2008; and (4) U.S. patent application Ser. No. 12/538,495, filed Aug. 10, 2009, which is a CIP of U.S. patent application Ser. No. 12/084,150 having a filing date of Apr. 7, 2009, U.S. patent application Ser. No. 12/195,863, filed on Aug. 21, 2008; and U.S. patent application Ser. No. 12/348,888, filed Jan. 5, 2009.

All of the applications referenced above are herein incorporated by reference.

TECHNICAL FIELD

The present invention relates generally to the analysis of multimedia content, and more specifically to a system for determining a user attention to displayed multimedia content based on an analysis of sensory inputs performed by a deep-content-classification system.

BACKGROUND

The ubiquity of access availability to information using the Internet and the worldwide web (WWW) has naturally drawn the focus of advertisers. As a result, the Internet has also become a popular medium for advertising, where commercials are included in web pages, and the advertisers try to understand where to best place their advertisements in order to draw the attention of the users.

Targeting advertisements towards a specific demographic audience is a key in successful advertising. Many solutions have been developed for gleaning demographic information about Internet users in order for advertisers to target an audience or user that would be more interested in their advertised product. With this aim, the demographic characteristics of the users that tend to visit certain websites are determined, in order to place ads targeted to the demographics, such as age, gender, etc. of users visiting the websites.

However, it is common for a group of people with similar demographic characteristics to have different tastes and preferences. For example, when two persons having similar demographics view an advertisement for a sea food restaurant, one may like, while the other may dislike, the advertised product. That is, for a group of people from the same demographic group, each person in the group may have individual preferences not shared with other persons in the group. Furthermore, users' preferences may change over time, thus leaving the content related to the user's previous preferences irrelevant. Therefore, solutions targeting advertisements discussed in the related art cannot provide a current indication as to whether or not the user likes or dislikes an advertised content.

It would be therefore advantageous to provide a solution that would enable determination of the attention of a user to content as the user views the content.

SUMMARY

Certain embodiments disclosed herein include a method for determining a user attention to at least one multimedia data element (MMDE) displayed in a web-page over a user computing device. The method comprises receiving a request to determine the user attention, wherein the request includes at least the web-page and an identification of the at least one MMDE in the web-page; receiving at least one sensory signal captured by at least one sensor connected to the user computing device; querying a deep-content-classification (DCC) system to find a match between at least one concept structure and the received sensory signal; receiving a first set of metadata related to the at least one matched concept structure; analyzing the returned set of metadata to determine the user attention with respect to the at least one MMDE; and associating the at least one MMDE with the determined user attention.

Certain embodiments disclosed herein also include a system for determining a user attention to at least one multimedia data element (MMDE) displayed in a web-page over a user computing device. The system comprises an interface to a network for receiving a request to determine the user attention, wherein the request includes at least the web-page and an identification of the at least one MMDE in the web-page and receiving at least one sensory signal captured by at least one sensor connected to the user computing device; a processor; and a memory connected to the processor, the memory contains instructions that when executed by the processor configures the system to perform: query a deep-content-classification (DCC) system to find a match between at least one concept structure and the received sensory signal; receive a first set of metadata related to the least one matched concept structure; analyze the returned set of metadata to determine the user attention with respect to the least one MMDE; and associate the least one MMDE with the determined user attention.

BRIEF DESCRIPTION OF THE DRAWINGS

The subject matter that is disclosed herein is particularly pointed out and distinctly claimed in the claims at the conclusion of the specification. The foregoing and other objects, features and advantages of the invention will be apparent from the following detailed description taken in conjunction with the accompanying drawings.

DETAILED DESCRIPTION

Figure 1:
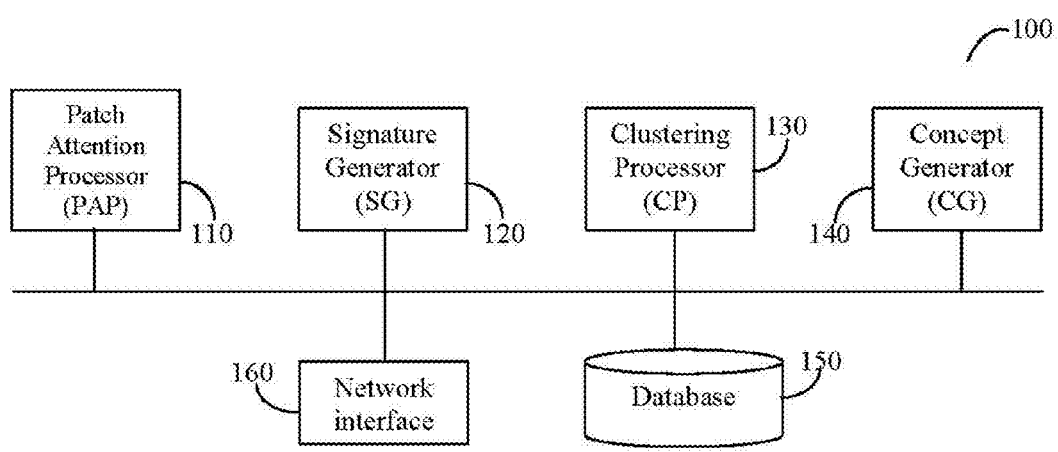
FIG. 1 is a diagram of a DCC system for creating concept structures.

The embodiments disclosed herein are only examples of the many possible advantageous uses and implementations of the innovative teachings presented herein. In general, statements made in the specification of the present application do not necessarily limit any of the various claimed inventions. Moreover, some statements may apply to some inventive features but not to others. In general, unless otherwise indicated, singular elements may be in plural and vice versa with no loss of generality. In the drawings, like numerals refer to like parts through several views.

FIG. 1 shows an exemplary and non-limiting diagram of a DCC system 100 for creating concept structures. The DCC system 100 is configured to receive multimedia data elements (MMDEs), for example from the Internet via the network interface 160. The MMDEs include, but are not limited to, images, graphics, video streams, video clips, audio streams, audio clips, video frames, photographs, images of signals, combinations thereof, and portions thereof. The images of signals are images such as, but not limited to, medical signals, geophysical signals, subsonic signals, supersonic signals, electromagnetic signals, and infrared signals.

The MMDEs may be stored in a database (DB) 150 or kept in the DB 150 for future retrieval of the respective multimedia data element. Such a reference may be, but is not limited to, a universal resource locator (URL). Every MMDE in the DB 150, or referenced therefrom, is then processed by a patch attention processor (PAP) 110 resulting in a plurality of patches that are of specific interest, or otherwise of higher interest than other patches. A more general pattern extraction, such as an attention processor (AP) may also be used in lieu of patches. The AP receives the MMDE that is partitioned into items; an item may be an extracted pattern or a patch, or any other applicable partition depending on the type of the MMDE. The functions of the PAP 110 are described herein below in more detail.

Those patches that are of higher interest are then used by a signature generator (SG) 120 to generate signatures respective of the patch. The operation of the signature generator (SG) 120 is described in more detail herein below. A clustering process (CP) 130 initiates a process of inter-matching of the signatures once it determines that there are a number of patches that are above a predefined threshold. The threshold may be defined to be large enough to enable proper and meaningful clustering. With a plurality of clusters a process of clustering reduction takes place so as to extract the most useful data about the cluster and keep it at an optimal size to produce meaningful results. The process of cluster reduction is continuous. When new signatures are provided after the initial phase of the operation of the CP 130, the new signatures may be immediately checked against the reduced clusters to save on the operation of the CP 130. A more detailed description of the operation of the CP 130 is provided herein below.

A concept generator (CG) 140 operates to create concept structures from the reduced clusters provided by the CP 130. Each concept structure comprises a plurality of metadata associated with the reduced clusters. The result is a compact representation of a concept that can now be easily compared against a MMDE to determine if the received MMDE matches a concept structure stored, for example in the DB 150, by the CG 140. This can be done, for example and without limitation, by providing a query to the DCC system 100 for finding a match between a concept structure and a MMDE. A more detailed description of the operation of the CG 140 is provided herein below.

It should be appreciated that the DCC system 100 can generate a number of concept structures significantly smaller than the number of MMDEs. For example, if one billion ($10^9$) MMDEs need to be checked for a match against another one billon MMDEs, typically the result is that no less than $10^9 \times 10^9 = 10^{18}$ matches have to take place, a daunting undertaking. The DCC system 100 would typically have around 10 million concept structures or less, and therefore at most only $2 \times 10^6 \times 10^9 = 2 \times 10^{15}$ comparisons need to take place, a mere 0.2% of the number of matches that have had to be made by other solutions. As the number of concept structures grows significantly slower than the number of MMDEs, the advantages of the DCC system 100 would be apparent to one with ordinary skill in the art.

The operation of the PAP 110 will now be provided in greater detail with respect to an image as the MMDE. However, this should not be understood as to limit the scope of the invention; other types of MMDEs are specifically included herein and may be handled by the PAP 110.

Figure 2:
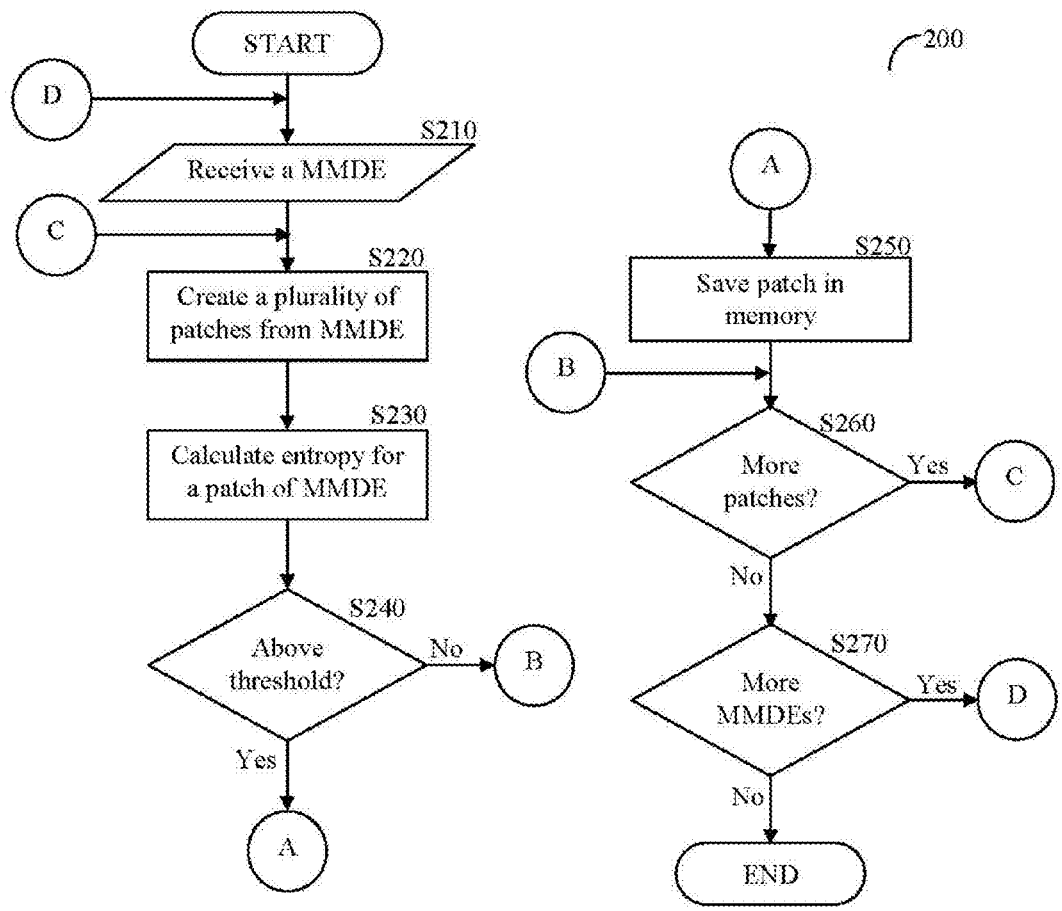
FIG. 2 is a flowchart illustrating the operation of the patch attention processor of the DCC system.

FIG. 2 depicts an exemplary and non-limiting flowchart 200 of the operation of the PAP 110. In S210 the PAP 110 receives a MMDE from a source for such MMDEs. Such a source may be a system that feeds the DCC system 100 with MMDEs or other sources for MMDEs, for example the world-wide-web (WWW). In S220 the PAP 110 creates a plurality of patches from the MMDE. A patch of an image is defined by, for example, its size, scale, location and orientation. A patch may be, for example and without limitation, a portion of an image of a size 20 pixels by 20 pixels of an image that is 1,000 pixels by 500 pixels. In the case of audio, a patch may be a segment of audio 0.5 seconds in length from a 5 minute audio clip. In S230 a patch not previously checked is processed to determine its entropy. The entropy is a measure of the amount of interesting information that may be present in the patch. For example, a continuous color of the patch has little interest while sharp edges, corners or borders, will result in higher entropy representing a lot of interesting information. The plurality of statistically independent cores, the operation of which is discussed in more detailed herein below, is used to determine the level-of-interest of the image and a process of voting takes place to determine whether the patch is of interest or not.

In S240, it is checked whether the entropy was determined to be above a predefined threshold, and if so execution continues with S250; otherwise, execution continues with S260. In S250 the patch having entropy above the threshold is stored for future use by the SG 120 in, for example, DB 150. In S260 it is checked whether there are more patches of the MMDE to be checked, and if so execution continues with S220; otherwise execution continues with S270. In S270 it is checked whether there are additional MMDEs, and if so execution continues with S210; otherwise, execution terminates. It would be appreciated by those of skill in the art that this process reduces the information that must be handled by the DCC system 100 by focusing on areas of interest in the MMDEs rather than areas that are less meaningful for the formation of a concept structure.

Figure 3:
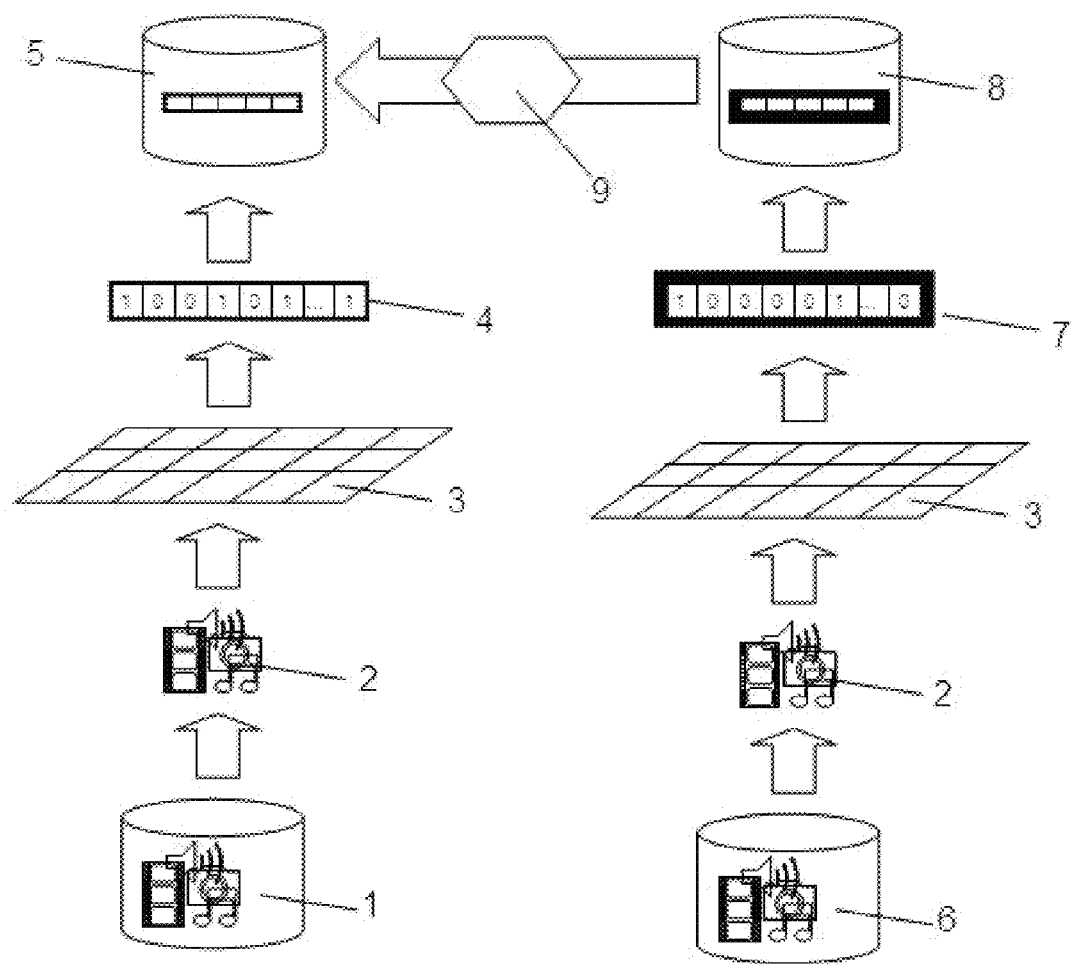
FIG. 3 is a block diagram depicting the basic flow of information in a large-scale video matching system.

A high-level description of the process for large scale video matching performed by the Matching System is depicted in FIG. 3. Video content segments 2 from a Master DB 6 and a Target DB 1 are processed in parallel by a large number of independent computational Cores 3 that constitute the Architecture. Further details on the computational Cores generation are provided below. The independent Cores 3 generate a database of Robust Signatures and Signatures 4 for Target content-segments 5 and a database of Robust Signatures and Signatures 7 for Master content-segments 8. An exemplary and non-limiting process of signature generation for an audio component is shown in detail in FIG. 4. Referring back to FIG. 3, at the final step, Target Robust Signatures and/or Signatures are effectively matched, by a matching algorithm 9, to Master Robust Signatures and/or Signatures database to find all matches between the two databases.

A brief description of the operation of the SG 120 is therefore provided, this time with respect to a MMDE which is a sound clip. However, this should not be understood as to limit the scope of the invention and other types of MMDEs are specifically included herein and may be handled by SG 120. To demonstrate an example of signature generation process, it is assumed, merely for the sake of simplicity and without limitation on the generality of the disclosed embodiments, that the signatures are based on a single frame, leading to certain simplification of the computational core's generation. The Matching System shown in FIG. 3 is extensible for signatures generation capturing the dynamics in-between the frames and the information of the frame's patches.

Figure 4:
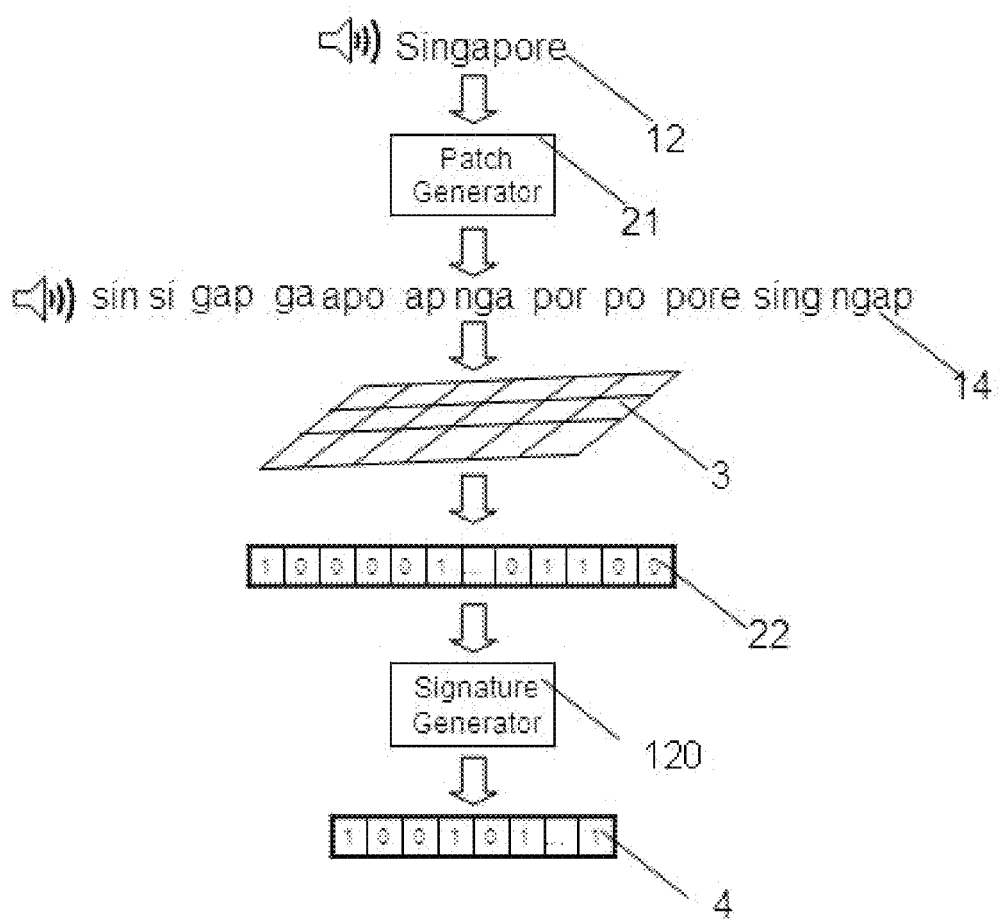
FIG. 4 is a diagram showing the flow of patches generation, response vector generation, and signature generation in a large-scale speech-to-text system.

The signatures generation process will be described with reference to FIG. 4. The first step in the process of signatures generation from a given speech-segment is to break-down the speech-segment to K patches 14 of random length P and random position within the speech segment 12. The breakdown is performed by the patch generator component 21. The value of K is determined based on optimization, considering the tradeoff between accuracy rate and the number of fast matches required in the flow process of the Matching System. In the next step, all the K patches are injected in parallel to all L computational Cores 3 to generate K response vectors 22. The vectors 22 are fed into the SG 120 to produce a Signatures and Robust Signatures 4.

In order to generate Robust Signatures, i.e., Signatures that are robust to additive noise L (where L is an integer equal to or greater than 1) computational cores are utilized in the Matching System. A frame i is injected into all the Cores. The computational cores 3 generate two binary response vectors: $\vec{S}$ which is a Signature vector, and $\vec{RS}$ which is a Robust Signature vector.

For generation of signatures robust to additive noise, such as White-Gaussian-Noise, scratch, etc., but not robust to distortions, such as crop, shift and rotation, etc., a core $C_i=\{n_i\}$ (1 ≤ i ≤ L) may consist of a single leaky integrate-to-threshold unit (LTU) node or more nodes. The node $n_i$ equations are:

$$V_i = \sum_j w_{ij} k_j$$

$n_i = \Box(V_i - Th_x)$; $\Box$ is a Heaviside step function; $w_{ij}$ is a coupling node unit (CNU) between node i and image component j (for example, grayscale value of a certain pixel j); $k_j$ is an image component j (for example, grayscale value of a certain pixel j); $Th_x$ is a constant Threshold value, where x is 'S' for Signature and 'RS' for Robust Signature; and $V_i$ is a Coupling Node Value.

The Threshold values $Th_x$ are set differently for Signature generation and for Robust Signature generation. For example, for a certain distribution of $V_i$ values (for the set of nodes), the thresholds for Signature ($Th_S$) and Robust Signature ($Th_{RS}$) are set apart, after optimization, according to at least one or more of the following criteria:

For: $V_i > Th_{RS}$                         I:

$$1 - p(V_i > Th_{RS}) - 1 - (1-\epsilon)^l \ll 1$$

i.e., given that I nodes (cores) constitute a Robust Signature of a certain image I, the probability that not all of these I nodes will belong to the Signature of same, but noisy image, $\tilde{I}$ is sufficiently low (according to a system's specified accuracy).

$$p(V_i > Th_{RS}) \approx l/L \quad \text{II:}$$

i.e., approximately I out of the total L nodes can be found to generate Robust Signature according to the above definition.

III: Both Robust Signature and Signature are generated for certain frame i.

It should be understood that the creation of a signature is a unidirectional compression where the characteristics of the compressed data are maintained but the compressed data cannot be reconstructed. Therefore, a signature can be used for the purpose of comparison to another signature without the need of comparison of the original data. The detailed description of the Signature generation can be found U.S. Pat. Nos. 8,326,775 and 8,312,031, assigned to common assignee, which are hereby incorporated by reference for all the useful information they contain.

Computational Core generation is a process of definition, selection and tuning of the Architecture parameters for a certain realization in a specific system and application. The process is based on several design considerations, such as: (a) The Cores should be designed so as to obtain maximal independence, i.e. the projection from a signal space should generate a maximal pair-wise distance between any two Cores' projections into a high-dimensional space; (b) The Cores should be optimally designed for the type of signals, i.e. the Cores should be maximally sensitive to the spatio-temporal structure of the injected signal, for example, and in particular, sensitive to local correlations in time and space. Thus, in some cases a Core represents a dynamic system, such as in state space, phase space, edge of chaos, etc., which is uniquely used herein to exploit their maximal computational power, and, (c) The Cores should be optimally designed with regard to invariance to a set of signal distortions, of interest in relevant applications. Detailed description of the Computational Core generation, the computational architecture, and the process for configuring such cores is discussed in more detail in the co-pending U.S. patent application Ser. No. 12/084,150 referenced above.

Hence, signatures are generated by the SG 120 responsive of patches received either from the PAP 110, or retrieved from the DB 150, as discussed hereinabove. It should be noted that other ways for generating signatures may also be used for the purpose the DCC system 100. Furthermore, as noted above, the array of computational cores may be used by the PAP 110 for the purpose of determining if a patch has an entropy level that is of interest for signature generation according to the principles of the invention. The generated signatures are stored, for example, in the DB 150, with reference to the MMDE and the patch for which it was generated thereby enabling back annotation as may be necessary.

Portions of the CP 130 have been discussed in detail in the co-pending U.S. patent application Ser. No. 12/507,489, entitled "Unsupervised Clustering of Multimedia Data Using a Large-Scale Matching System", filed Jul. 22, 2009, assigned to common assignee (the "'489 Application"), and which is hereby incorporated for all that it contains. In accordance with an embodiment an inter-match process and clustering thereof is utilized. The process can be performed on signatures provided by the SG 120. It should be noted though that this inter-matching and clustering process is merely an example for the operation of the CP 130 and other inter-matching and/or clustering processes may be used for the purpose of the invention.

Following is a brief description of the inter-match and clustering process. The unsupervised clustering process maps a certain content-universe onto a hierarchical structure of clusters. The content-elements of the content-universe are mapped to signatures, when applicable. The signatures of all the content-elements are matched to each other, and consequently generate the inter-match matrix. The described clustering process leads to a set of clusters. Each cluster is represented by a small/compressed number of signatures, for example signatures generated by SG 12 as further explained hereinabove, which can be increased by variants. This results in a highly compressed representation of the content-universe. A connection graph between the multimedia data elements of a cluster may be stored. The graph can then be used to assist a user searching for data to move along the graph in the search of a desired multimedia data element.

In another embodiment, upon determination of a cluster, a signature for the whole cluster may be generated based on the signatures of the multimedia data elements that belong to the cluster. It should be appreciated that using a Bloom filter may be used to reach such signatures. Furthermore, as the signatures are correlated to some extent, the hash functions of the Bloom filter may be replaced by simpler pattern detectors, with the Bloom filter being the upper limit.

While signatures are used here as the basic data elements, it should be realized that other data elements may be clustered using the techniques discussed above. For example, a system generating data items is used, where the data items generated may be clustered according to the disclosed principles. Such data items may be, without limitation, multimedia data elements. The clustering process may be performed by dedicated hardware or by using a computing device having storage to store the data items generated by the system and then performing the process described herein above. Then, the clusters can be stored in memory for use as may be deemed necessary.

The CP 130 further uses an engine designed to reduce the number of signatures used in a structure, in a sense, extracting only the most meaningful signatures that identify the cluster uniquely. This can be done by testing a removal of a signature from a cluster and checking if the MMDEs associated with the cluster still are capable of being recognized by the cluster through signature matching.

The process of signature extraction is on-going as the DCC system 100 operates. It should be noted that after initialization, upon signature generation by the SG 120 of a MMDE, its respective signature is first checked against the clusters to see if there is a match and if so it may not be necessary to add the signature to the cluster or clusters but rather simply by associating the MMDE with the identified cluster or clusters. However, in some cases where additional refinement of the concept structure is possible, the signature may be added, or at times even replace one or more of the existing signatures in the reduced cluster. If no match is found then the process of inter-matching and clustering may take place.

Figure 5:
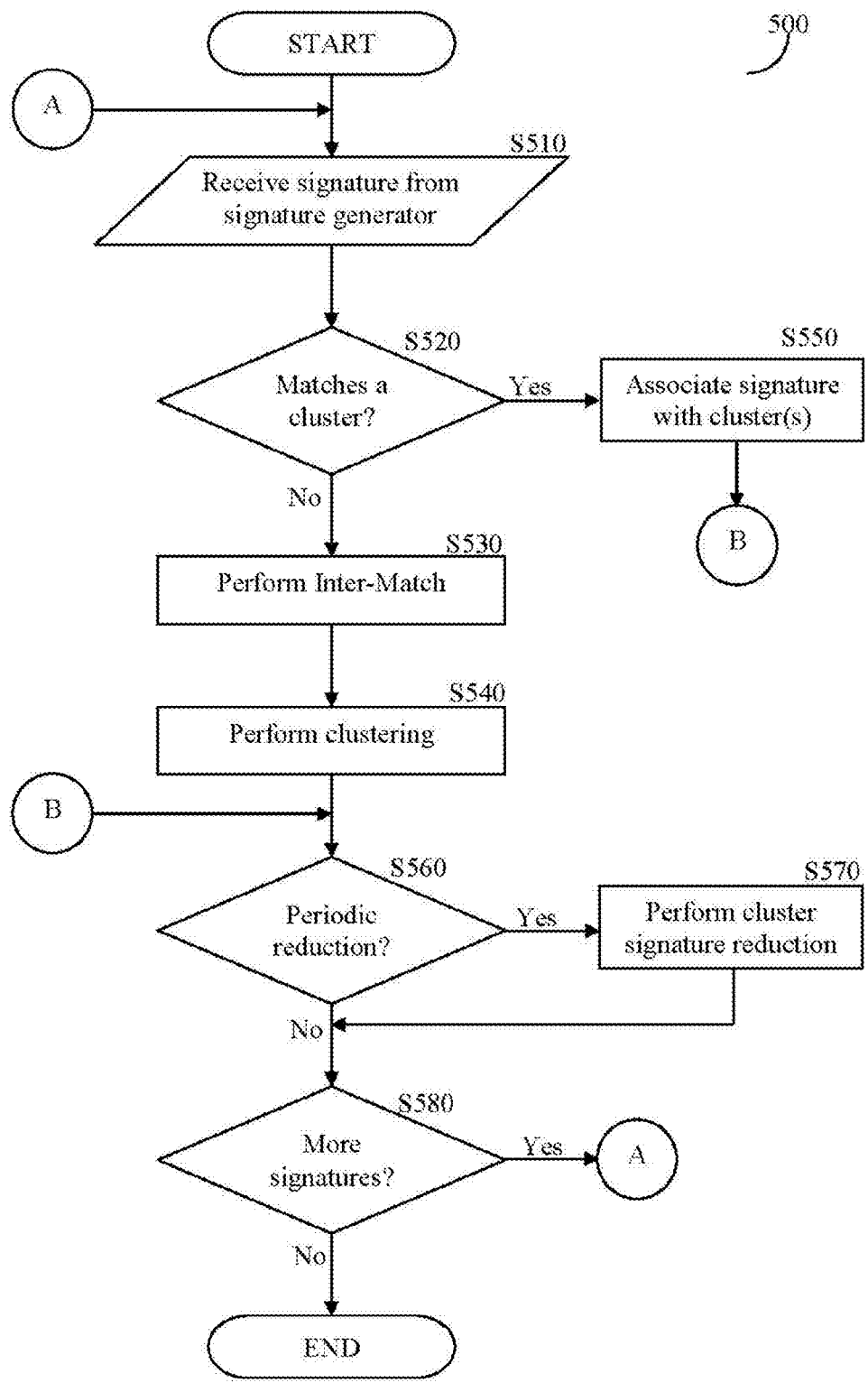
FIG. 5 is a flowchart illustrating the operation of the clustering processor of the DCC system.

FIG. 5 depicts an exemplary and non-limiting flowchart 500 of the operation of the CP 130. In S510 a signature of a MMDE is received, for example from the SG 120. In S520 it is checked whether the signature matches one or more existing clusters and if so execution continues with S550; otherwise, execution continues with S530. In S530 an inter-match between a plurality of signatures previously received by the DCC system 100 is performed, for example in accordance with the principles of the '489 Application. As may be necessary the DB 150 may be used to store results or intermediate results as the case may be, however, other memory elements may be used. In S540 a clustering process takes place, for example in accordance with the principles of the '489 Application. As may be necessary the DB 150 may be used to store results or intermediate results as the case may be, however, other memory elements may be used.

In S550, the signature identified to match one or more clusters is associated with the existing cluster(s). In S560 it is checked whether a periodic cluster reduction is to be performed, and if so execution continues with S570; otherwise, execution continues with S580. In S570 the cluster reduction process is performed. Specifically, the purpose of the operation is to ensure that in the cluster there remains the minimal number of signatures that still identify all of the MMDEs that are associated with the signature reduced cluster (SRC). This can be performed, for example, by attempting to match the signatures of each of the MMDEs associated with the SRC having one or more signatures removed therefrom. The process of cluster reduction for the purpose of generating SRCs may be performed in parallel and independently of the process described herein above. In such a case after either S560 or S570 the operation of S580 takes place. In S580 it is checked whether there are additional signatures to be processed and if so execution continues with S510; otherwise, execution terminates. SRCs may be stored in memory, such as DB 150, for the purpose of being used by other elements comprising the DCC system 100.

The CG 140 performs two tasks, it associates metadata to the SRCs provided by the CP 130 and it associates between similar clusters based on commonality of metadata. Exemplary and non-limiting methods for associating metadata with MMDEs is described in U.S. patent application Ser. No. 12/348,888, entitled "Methods for Identifying Relevant Metadata for Multimedia Data of a Large-Scale Matching System", filed on Jan. 5, 2009, assigned to common assignee (the "'888 Application"), and which is hereby incorporated for all that it contains. One embodiment of the '888 Application includes a method for identifying and associating metadata to input MMDEs. The method comprises comparing an input first MMDE to at least a second MMDE; collecting metadata of at least the second MMDE when a match is found between the first MMDE and at least the second MMDE; associating at least a subset of the collected metadata to the first MMDE; and storing the first MMDE and the associated metadata in a storage.

Another embodiment of the '888 Application includes a system for collecting metadata for a first MMDE. The system comprises a plurality of computational cores enabled to receive the first MMDE, each core having properties to be statistically independent of each other core, each generate responsive to the first MMDE a first signature element and a second signature element, the first signature element being a robust signature; a storage unit for storing at least a second MMDE, metadata associated with the second MMDE, and at least one of a first signature and a second signature associated with the second MMDE, the first signature being a robust signature; and a comparison unit for comparing signatures of MMDEs coupled to the plurality of computational cores and further coupled to the storage unit for the purpose of determining matches between multimedia data elements; wherein responsive to receiving the first MMDE the plurality of computational cores generate a respective first signature of said first MMDE and/or a second signature of said first MMDE, for the purpose of determining a match with at least a second MMDE stored in the storage and associating metadata associated with the at least second MMDE with the first MMDE.

Similar processes to match metadata with a MMDE or signatures thereof may be used. Accordingly, each SRC is associated with metadata which is the combination of the metadata associated with each of the signatures that are included in the respective SRC, preferably without repetition of metadata. A plurality of SRCs having metadata may now be associated to each other based on the metadata and/or partial match of signatures. For example, and without limitation, if the metadata of a first SRC and the metadata of a second SRC overlap more than a predetermined threshold level, for example 50% of the metadata match, they may be considered associated clusters that form a concept structure. Similarly, a second threshold level can be used to determine if there is an association between two SRCs where at least a number of signatures above the second threshold are identified as a match with another SRC. As a practical example one may want to consider the concept of Abraham Lincoln where images of the late President and features thereof, appear in a large variety of photographs, drawings, paintings, sculptures and more and are associated as a concept structure of the concept "Abraham Lincoln". Each concept structure may be then stored in memory, for example, the DB 150 for further use.

Figure 6:
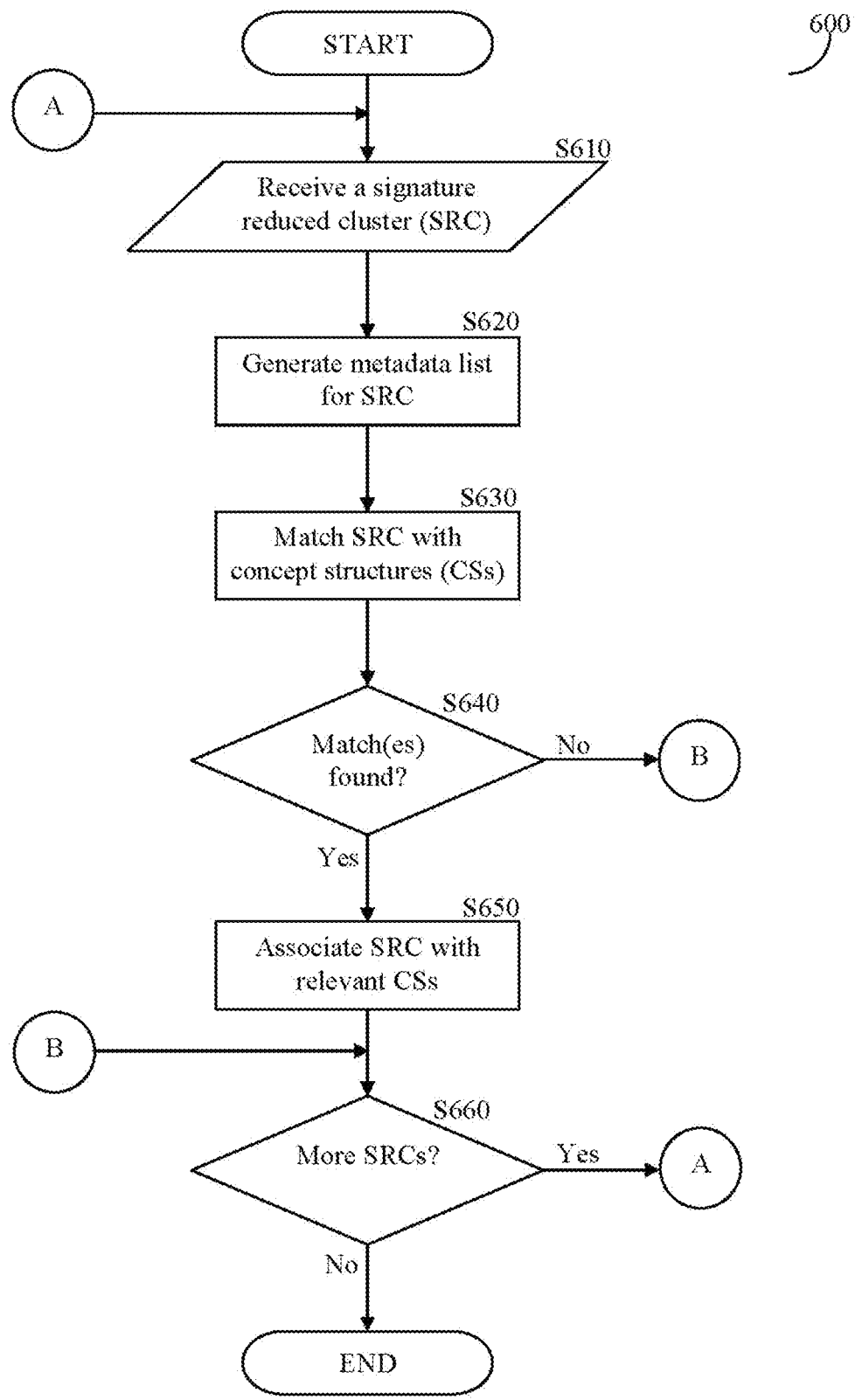
FIG. 6 is a flowchart illustrating the operation of the concept generator of the DCC system.

FIG. 6 shows an exemplary and non-limiting flowchart 600 of the operation of the CG 140. In S610 the CG 140 receives a SRC from either the CP 130 or by accessing memory, for example, the DB 150. In S620 metadata are generated for the signatures of the SRC, for example in accordance with the principles described hereinabove. A list of the metadata is created for the SRC preferably with no metadata duplication. In one embodiment the commonality of metadata is used to signify the strength of the metadata with respect to a signature and/or the SRC, i.e., a higher number of metadata repetitions is of more importance to the SRC than a lower number of repetitions. Furthermore, in one embodiment a threshold may be used to remove those metadata that have a significantly low rate of repetition as not being representative of the SRC.

In S630 the SRC is matched to previously generated SRCs to attempt to find various matches, as described, for example, hereinabove in more detail. In S640, it is checked if at least one match was found and if so, execution continues with S650; otherwise, execution continues with S660. In S650 the SRC is associated with one or more of the concept structures to which the SRC has been shown to match. In S660 it is checked whether additional SRCs are to be received and if so execution continues with S610; otherwise, execution terminates.

A person skilled in the art would now appreciate the advantages of the DCC system 100 and methods thereof. The DCC system 100 is capable of creating automatically and in an unsupervised fashion concept structures of a wide variety of MMDEs. When checking a new MMDE it may be checked against the concept structures stored, for example, in the DB 150, and upon detection of a match providing the concept information about the MMDE. With the number of concept structures being significantly lower than the number of MMDEs the solution is cost effective and scalable for the purpose of identification of content of a MMDE.

Figure 7:
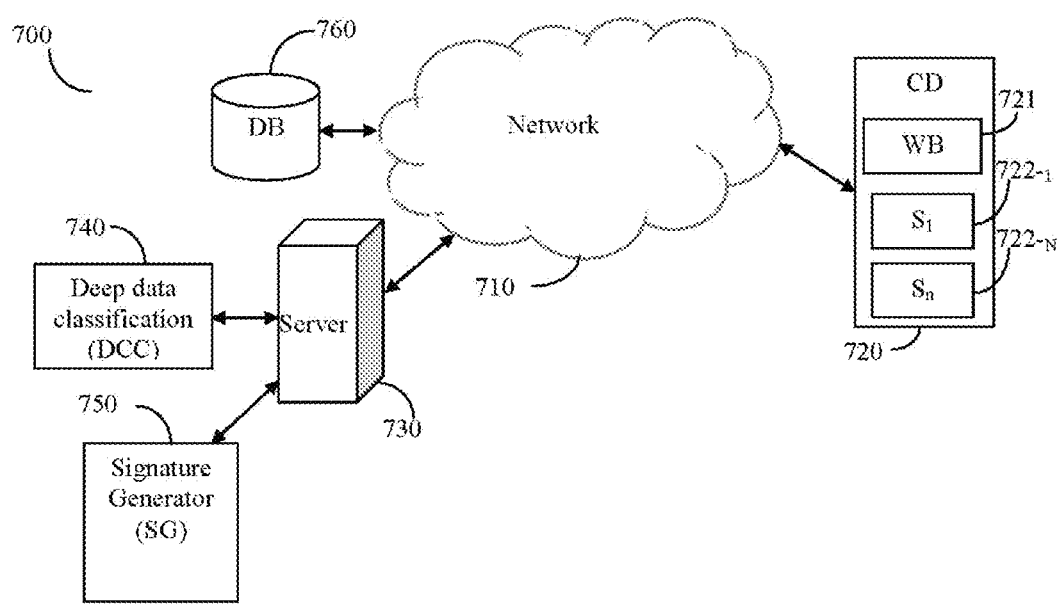
FIG. 7 is a diagram of a network system utilized to describe certain disclosed embodiments.

FIG. 7 shows an exemplary and non-limiting schematic diagram of a network system 700 utilized to describe various disclosed embodiments. A network 710 is used as a means for communication between different elements of the system 700. The network 710 may be the Internet, the world-wide-web (WWW), a local area network (LAN), a wide area network (WAN), a metro area network (MAN), and the like.

At least one computing device 720 is connected to the network 710. The computing device 720 includes at least a program to access the WWW, such as but not limited to a web browser 721. The computing device 720 also includes one or more physical sensors 722-1 through 722-n (collectively referred hereinafter as sensors 722 or individually as a sensor 722, merely for simplicity purposes) configured to capture sensory information. In a preferred embodiment, the sensory information is captured with respect to a MMDE displayed over the web browser 721. Each one of the sensors 722 may be, for example, but not limited to, a camera, a web camera, a microphone, a Global Positioning System (GPS), an image analyzer, a speech recognizer, and the like.

The computing device 720 may be, for example, a personal computer (PC), a personal digital assistant (PDA), a mobile phone, a smartphone, a tablet computer, and other kinds of wired and mobile appliances, equipped with browsing, viewing, listening, filtering, and managing capabilities.

Also connected to the network 710 is a server 730 configured to perform the process of determining the user attention to the displayed content. To this end, the server 730 is connected to a DCC system 740 and a signature generator 750. The DCC system 740 is configured and operates as the DCC system 100 discussed in detail above. The signature generator 750 is configured and operates as the SG 120. In certain configurations, the SG of the DCC system is utilized as the signature generator 750. The DCC system 740 and signature generator 750 may be connected through the server 730 to the network 710 or through a direct connection. In certain configurations, the DCC system 740 and signature generator 750 may be embedded in the server 730. It should be noted that the server 730 typically comprises a processing unit and a memory (not shown). The processor is coupled to the memory, which is configured to contain instructions that can be executed by the processing unit. The server 730 also includes a network interface (not shown) to the network 710.

According to the embodiments disclosed herein, a user visits a web-page using a web-browser 721. When the web-page is uploaded on the user's web-browser 721, a request is sent to the server 730 to analyze an identified multimedia content element (the "input MMDE") contained in the web-page. The request to analyze the input MMDE can be generated and sent by a script executed in the web-page, and/or an agent (e.g., plug-in) installed in the web-browser 720. The request may include the actual web-page with an identifier of the input MMDE to be processed, a URL of the web-page with an identifier of the input MMDE, or a URL to the element to be analyzed. In one embodiment, the identification of the input MMDE(s) to be processed is provided by an ad-serving system (not shown). The input MMDE processed by the server 130 may be an image, a graphic, a video stream, a video clip, an audio stream, an audio clip, a video frame, a photograph, and an image of signals (e.g., spectrograms, phasograms, scalograms, etc.), and/or combinations thereof and portions thereof. In one embodiment, the MMDE is a web advertisement.

The request sent from the web-browser also includes sensory signal captured by the sensor 722. The sensory signal may be, for example, an audio signal, a video signal, coordinates, a sonography signal, and so on. In one embodiment, the request may include additional parameters, such as an IP address of the computing device, time, date, a browser type, and so on. Such parameters may be used in determining the user's attention and/or to provide supplemental information for the association of the input MMDE and the determined user's attention.

According to the one embodiment, the DCC system 740 is primarily utilized to match between the input MMDE and one more concept structures (or concepts) to determine which the MMDE represents, for example, based on the metadata associated with the matched concept(s). The MMDE may be a sensory signal captured by a sensor 722 and/or multimedia content displayed over a web browsers.

Specifically, according to the disclosed embodiments, the web browser 721 is configured to upload web-pages or references (e.g., URLs) to the web-pages that contain at least one multimedia data element (MMDE). The server 130 is configured to determine the attention of the user of the computing device 720 with respect to the input MMDE displayed in each web page.

With this aim, the received sensory signal is processed and analyzed for the purpose of matching the sensory signal to concept structures generated and maintained by the to the DCC system 740. Such a match requires generating at least one signature to the sensory signal and matching the generated signature(s) against the concept structures. The signature for the sensory signal may be generated by means of the signature generator 750. The matching between signatures and concept structures is performed as discussed above.

The metadata of each matching concept structure is further analyzed to determine the attention of the user to the MMDE displayed to the user. As discussed above, the concept is a collection of signatures representing MMDEs and metadata describing the concept. As a non-limiting example, a 'smiley face' concept is a signature reduced cluster of signatures describing multimedia elements related to, (e.g., to people and cartoons representing smiles and/or happy faces), as well as a set of metadata representing proving textual representation (e.g., happy, amazed, amused, etc.) of the concept. If the sensory signal is an image of the user having a smile on his/her face, then the sensory signal (or its respective signature) would likely match the 'smiley face' concept. An analysis of the metadata would determine the result that the user attention was positive to the MMDE contained in the webpage sent along the sensory signal.

In one embodiment, if the sensory signal matches more than one concept structure and/or multiple sensory signals are received, the respective metadata of the matched concepts are correlated and then analyzed to determine the user attention. The determined attention is associated with the input MMDE.

In one embodiment, the server 130 is also configured to match the input MMDE to one or more concept structures. The metadata of concept structures matching the web-page's MMDE is correlated to the determined user's attention (or the metadata representing the same). This embodiment provides a general idea on what a particular user would like or dislike. As a non-limiting example, the 'Superman concept' is a signature reduced cluster of signatures describing multimedia elements related to, e.g., to the Superman comic and a set of metadata representing proving textual representation of the Superman concept structure. If the input MMDE is matched to the Superman concept and the user's attention determined with respect to the input MMDE is positive, then the outcome of such correlation would be that the user likes comics in general, and Superman comics in particular. It should be appreciated that using signatures and concept structures as part of the analysis ensures more accurate recognition of the users attention to displayed content, and thus to provide future content (e.g., online ads) that would better fit the user's interest.

In one embodiment, correlation between matching concept structures is performed. This can be achieved by identifying a ratio between signatures' sizes, a spatial location of each signature, and so on using the probabilistic models. In one embodiment the system 700 further comprises a database, for example, the DB 760 which is configured to store the input MMDEs together with the respective user's attention, and any other supplemental information as discussed above.

Figure 8:
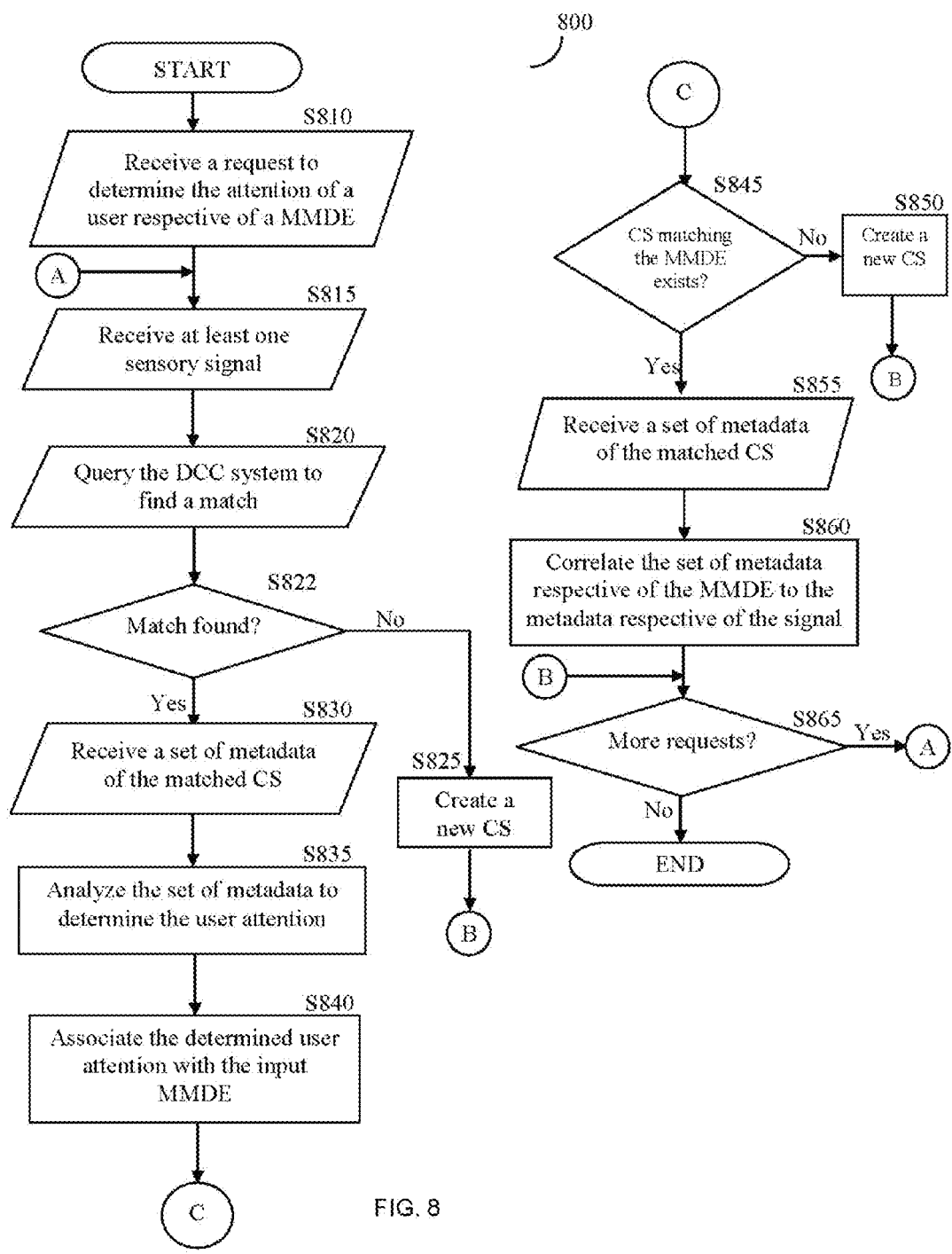
FIG. 8 is a flowchart illustrating a method for determining attention of a user to displayed multimedia content in accordance with one embodiment.

FIG. 8 is a non-limiting and exemplary flowchart 800 describing a method for determining a user attention to the displayed multimedia content according to one embodiment. In an embodiment the method is performed by the server 730. In S810, a request is received to determine the attention of a user respective of a MMDE included in the web-page that the user visits over the web-browser 721. As noted above, the request may include the actual web-page with an identifier of the input MMDE to be processed, a URL of the web-page with an identifier of the input MMDE, or a URL to the element to be analyzed. The request may also include additional parameters, such as an IP address of the computing device, time, date, a browser type, and so on.

In S815, at least one sensory signal captured by the sensor 722 while the user viewed the web-page is received. The sensory signal may be, for example, an audio signal, a video signal, coordinates, a sonography signal, and so on. It should be appreciated that the sensory signals are also multimedia signals that can be processed by the DCC system and the signature generator.

In S820, the DCC system (e.g., system 740) is queried to find a match between at least one concept structure (CS) and the received sensory signal. In S822, it is checked if such a match is found, and if so execution continues with S830; otherwise, execution continues with S825. In S825, if a match was not found, the sensory signal is input to the DCC system to create a new concept structure as discussed above and execution continues with S865. In S830, a set of metadata of the matched concept structure is returned.

In S835, the set of returned metadata is analyzed to determine the user's attention. As noted above, the metadata provides textual representation of the contents of the concept structure, thus the analysis of the textual representation also determines if at least the user's attention with respect to the input MMDE was positive (like), negative (dislike) or natural. Examples for the operation of S835 are provided above.

In S840, the determined user's attention is associated with the input MMDE and such association is saved optionally together with the supplemental information in the database.

Optionally, in S845, another query is sent to the DCC system to match the input MMDE to one or more concept structures. If such a match is found, execution continues with S855 where a set of metadata of the matched concept structure is returned. If a match was not found, execution continues with S850 where the input MMDE is provided to the DCC system to create a new concept structure as discussed above.

In S860, the metadata returned with respect to the input MMDE is correlated with the metadata returned with respect to the sensory signal and/or the determined attention. The correlation outcome provides a general idea about the preferences of the user. The correlation outcome may be saved, in a database, with an identifier identifying the user (e.g., a user name) and/or an identifier identifying the computing device (e.g., an IP address). In S865 it is checked whether there are additional requests and if so, execution continues with S815, otherwise, execution terminates.

Following is another non-limiting example for the operation of the embodiments discussed above. A request to analyze an image shown in a web page is received by the server 730. The image is analyzed by the server 730, and a signature is generated by the signature generator 750 respective of a kitten shown in the image. A web camera captures a picture of a user which is analyzed by the server 730 as the sensory signal. A signature is generated by the signature generator 750 respective of a facial expression shown in the picture. The signature generated respective of the picture is matched to a concept structure representing positive facial expressions. Respective of the match, the user's attention is determined positive. The server 730 is then configured to determine that the user positively responds to multimedia content that comprises a kitten, thus the user attention to such multimedia content is determined to be of high interest to the user.

The embodiments disclosed herein may be implemented as hardware, firmware, software, or any combination thereof. Moreover, the software is preferably implemented as an application program tangibly embodied on a program storage unit or non-transitory computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the several embodiments and the concepts contributed by the inventor to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What we claim is:

1. A method for determining a user attention to at least one multimedia data element (MMDE) displayed in a web-page over a user computing device, comprising:
   receiving a request to determine the user attention, wherein the request includes at least the web-page and an identification of the at least one MMDE in the web-page;
   receiving at least one sensory signal captured by at least one sensor connected to the user computing device;
   querying a deep-content-classification (DCC) system to find a match between at least one concept structure and the received sensory signal, wherein the at least one concept structure includes a plurality of metadata associated with reduced clusters of MMDEs, the clusters represented by a compressed number of signatures;
   receiving a first set of metadata related to the at least one matched concept structure;
   analyzing the returned set of metadata to determine the user attention with respect to the at least one MMDE; and
   associating the at least one MMDE with the determined user attention.

2. The method of claim 1, further comprising:
   querying the DCC system to find a match between at least one concept structure and the at least one MMDE; and
   correlating a second set of metadata returned respective of the at least one MMDE with at least one of: the determined user attention and the first set of metadata.

3. The method of claim 2, wherein each of the first and second set of metadata is a textual representation of multimedia content associated with the respective matched concept structure.

4. The method of claim 2, wherein further comprising:
   generating at least one signature respective of the MMDE and the sensory signal prior to querying of the MMDE.

5. The method of claim 1, wherein the at least one sensory signal is at least one of: an audio signal, a video signal, coordinates, and a sonography signal.

6. The method of claim 1, wherein the MMDE is at least one of: an image, graphics, a video stream, a video clip, an audio stream, an audio clip, a video frame, a photograph, images of signals, medical signals, geophysical signals, subsonic signals, supersonic signals, electromagnetic signals, and infrared signals.

7. The method of claim 1, wherein the request further includes supplemental information, wherein the supplemental information comprises at least one of: an IP address of the user computing device, time, date, and a browser type of the IP address of the user computing device.

8. The method of claim 1, wherein the DCC system includes:
   an attention processor (AP) for generating a plurality of items from the received sensory signal and determining which of the generated items are of interest for signature generation;
   a signature generator (SG) for generating at least one signature responsive to at least one item of interest of the sensory signal; and
   a concept generator (CG) for matching between the at least one signature generated responsive to at least one item of interest of the sensory signal and the at least one concept structure to identify at least the first set of metadata.

9. A non-transitory computer readable medium having stored thereon instructions for causing one or more processing units to execute the method according to claim 1.

10. A system for determining a user attention to at least one multimedia data element (MMDE) displayed in a web-page over a user computing device, comprising:
    an interface to a network for receiving a request to determine the user attention, wherein the request includes at least the web-page and an identification of the at least one MMDE in the web-page for receiving at least one sensory signal captured by at least one sensor connected to the user computing device;
    a processor; and
    a memory connected to the processor, the memory contains instructions that when executed by the processor, the system is configured to:

query a deep-content-classification (DCC) system to find a match between at least one concept structure and the received sensory signal, wherein the at least one concept structure includes a plurality of metadata associated with reduced clusters of the MMDEs, the clusters represented by a compressed number of signatures;

receive a first set of metadata related to the at least one matched concept structure;

analyze the returned set of metadata to determine the user attention with respect to the at least one MMDE; and associate the at least one MMDE with the determined user attention.

11. The system of claim 10, further comprising a database configured to save associations of the at least one MMDE with the determined user attention.

12. The system of claim 10, wherein the system is further configured to:

query the DCC system to find a match between the at least one concept structure and the at least one MMDE; and correlate a second set of metadata returned respective of the least one MMDE with at least one of the determined user attention and the first set of metadata.

13. The system of claim 12, wherein each of the first and second set of metadata is a textual representation of multimedia content associated with the respective matched concept structure.

14. The system of claim 12, wherein the system is further configured to:

generate at least one signature to each of the MMDE and the sensory signal prior to querying of the MMDE.

15. The system of claim 10, wherein the at least one sensory signal is at least one of: an audio signal, a video signal, coordinates, and a sonography signal.

16. The system of claim 10, wherein the MMDE is at least one of: an image, graphics, a video stream, a video clip, an audio stream, an audio clip, a video frame, a photograph, images of signals, medical signals, geophysical signals, subsonic signals, supersonic signals, electromagnetic signals, and infrared signals.

17. The system of claim 10, wherein the request further includes supplemental information, wherein the supplemental information comprises at least one of: an IP address of the user computing device, time, date, and a browser type of the IP address of the user computing device.

18. The system of claim 10, wherein the DCC system includes:

an attention processor (AP) for generating a plurality of items from the received sensory signal and determining which of the generated items are of interest for signature generation;

a signature generator (SG) for generating at least one signature responsive to at least one item of interest of the sensory signal; and a concept generator (CG) for matching between the at least one signature generated responsive to at least one item of interest of the sensory signal and the at least one concept structure to identify at least the first set of metadata.

* * * * *